(No Model.) 2 Sheets—Sheet 1.
W. H. LYTELL.
APPARATUS FOR PRODUCING ILLUSORY DRAMATIC EFFECTS.
No. 498,669. Patented May 30, 1893.
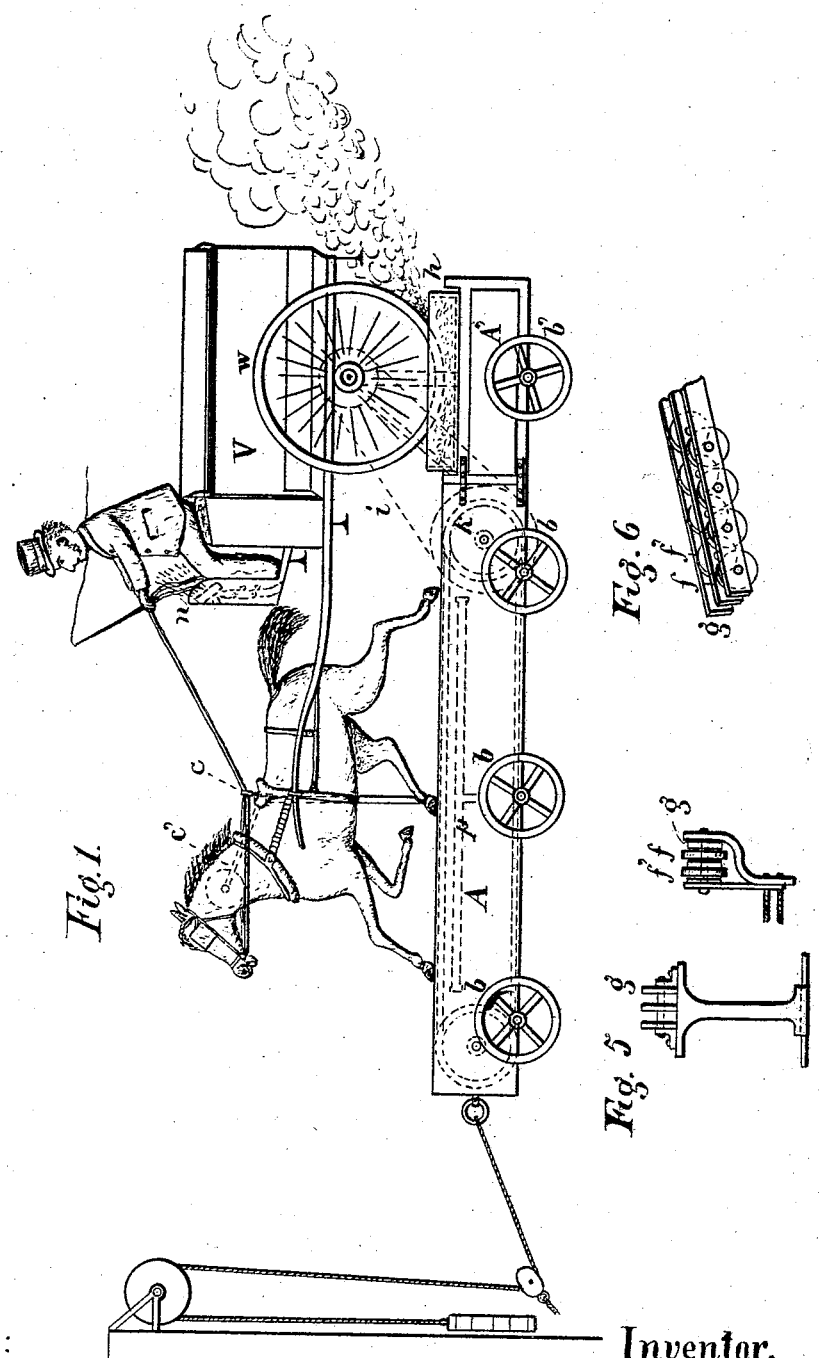
Witnesses:
A. Okerender
Wm. Feldman
Inventor,
William H. Lytell
by Geisler, attorney.

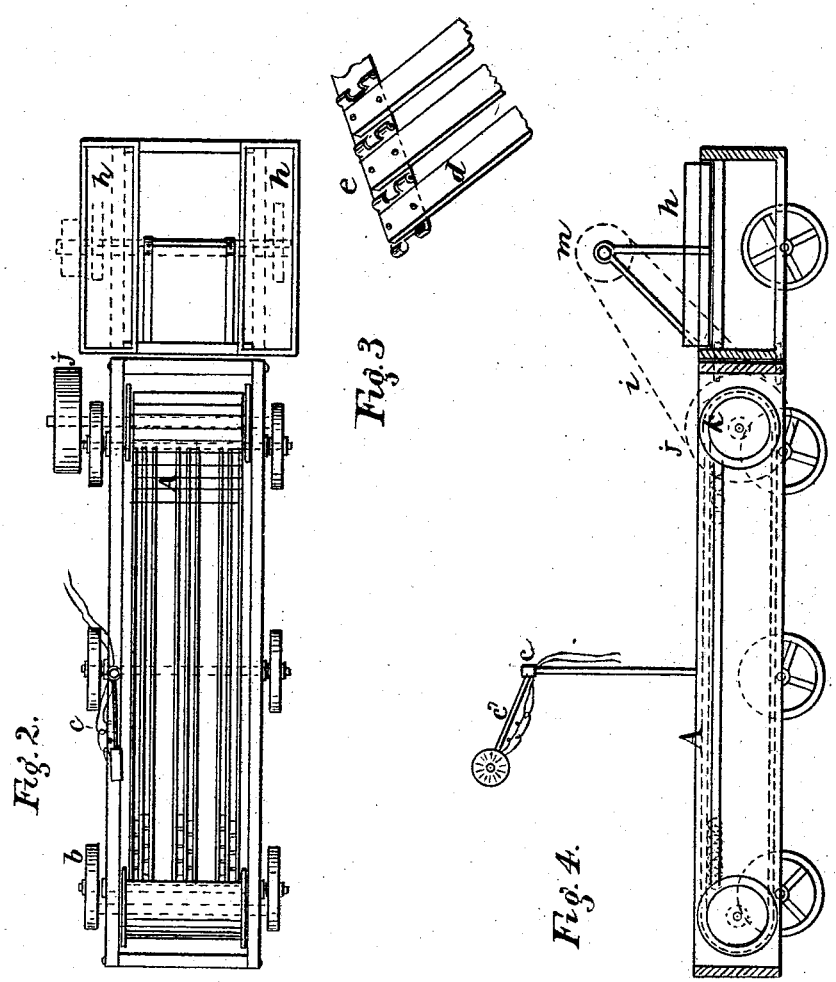

UNITED STATES PATENT OFFICE.

WILLIAM H. LYTELL, OF PORTLAND, OREGON.

APPARATUS FOR PRODUCING ILLUSORY DRAMATIC EFFECTS.

SPECIFICATION forming part of Letters Patent No. 498,669, dated May 30, 1893.

Application filed September 24, 1892. Serial No. 446,858. (No model.)

*To all whom it may concern:*

Be it known that I, WILLIAM H. LYTELL, a subject of the Queen of Great Britain, residing at Portland, Multnomah county, State of Oregon, have invented a new and Improved Apparatus for Producing Illusory Dramatic Effects, of which the following is a specification, reference being had to the accompanying drawings, as forming a part hereof.

The object of my invention is to improve upon the apparatus heretofore used for producing the effect of an animal and vehicle traveling along a path of considerable length, or simulating a horse race, so as to give the same a more realistic appearance. To accomplish this object I provide my apparatus with means for revolving the wheels of the vehicle quite rapidly, corresponding to the pace at which the animal is supposed to be traveling, and permit the rim of the wheels to rotate in a receptacle filled with earth so that such wheels may raise small clouds of dust. I further provide means for blowing a current of air through the horse's mane and in the faces and against the clothing of the persons on the vehicle so as to imitate the natural effects produced by a current of air blowing against the animal and persons when traveling at a rapid rate. The apparatus used by me in accomplishing these results is illustrated in said accompanying drawings, in which—

Figure "1" is a side elevation. Fig. "2" is a top view; Fig. "3," part of a detail; Fig. "4," a longitudinal section, and Figs. "5" and "6" details.

Like letters refer to like parts throughout the several views.

The endless path "A," made of sufficient strength and suitable mechanism, is supported on wheels "b" to facilitate the moving of the same across the stage. The animal runs on this portion of my apparatus the same as in similar contrivances for like purposes. The frame of said endless path, however, is provided with a rigid post (c), which is connected with the harness of the horse so as to keep him on the path, and an arm (c') projects from said post (c), and carries at its end a fan, preferably operated by electricity, for producing a current of air to blow through the animal's mane.

To operate an easy running endless path I believe it preferable that the lags (d) be fastened to a sort of linked chain (e) (see Fig. "3."), and that said path travel over an anti-friction track, affording sufficient strength, which might consist of a double row of anti-friction wheels (f and f'), the axles of which are journaled alternately so as to present as even a surface as possible. The axles of said anti-friction wheels are supported in rails (g) and these affixed to and supported by the frames containing the mechanism of the endless path by devices as shown in Fig. (5).; I prefer three tracks for the path to travel upon, one on each side and one in the center, and also to use some anti-frictional device fixed in the lower part of the frame for the return end of said endless path to travel upon to prevent the same from sagging. The vehicle (V) is suspended by some suitable contrivance fixed either to an extension of the frame of the endless path or else consisting of a separate section (A'), also provided with wheels (b'), and with means for attaching the same to the main frame (A), the vehicle being so suspended as to leave the wheels (w) thereof free and said section (A') being provided with boxes or other receptacles (h) filled with earth, so that such vehicle wheels in their revolutions will grind in this earth, and eject some of it in the form of small clouds of dust, such wheels being rotated by the belt (i) running from the pulley (j) on the shaft of the drum (k) to a pulley (m) affixed on the wheel-axle. To facilitate the operation of this portion of my apparatus the vehicle wheels should be fixed on their axle, and such axle revolve in a tubular contrivance attached to the bottom of the vehicle.

Facing the driver and such other persons as ride on the vehicle I adjust at a suitable angle one or more fans, preferably operated by electricity, adapted to throw a current of air into their faces and against their clothing, simulating the effect of driving rapidly in the open air.

The whole of my apparatus may also be further provided with some suitable means for gradually drawing the same across the stage.

By using two or more of the apparatus that I have described one can produce a race with much more realistic effect than has heretofore been done.

My apparatus is preferably used in combination also with a panoramic scene capable of being moved along so as to simulate scenery passed by the vehicle.

If desirable, to produce the effect of dust raised by the horse's feet, a length of pipe might be arranged within the housing of the endless path, parallel to the top thereof, as indicated in Fig. 1 in the drawings by broken lines, p, such pipe length being provided with numerous small perforations on its upper surface, and being closed at one end, and connected at the other end by suitable means to a contrivance generating or containing steam under pressure, so that such steam will be forced into said pipe p, and caused to ooze out of the said small perforations in the same.

Now what I claim as my invention, and desire to secure by Letters Patent, is—

1. In a stage apparatus of the character mentioned, the combination of a vehicle suitably mounted on a contrivance so as to leave the wheels thereof free, a pulley on the shaft of the rear drum on which the endless path of said apparatus travels a pulley on the wheel axle of said vehicle, and a suitable belt for communicating the motion of the said drum to the wheels of the vehicle and rotating the latter, substantially as set forth.

2. In a stage apparatus of the character mentioned, the combination of an endless path, a vehicle supported by a suitable contrivance so as to leave the wheels thereof free, means for revolving said wheels and a receptacle containing loose earth for such wheels to grind in to raise dust, substantially as set forth.

3. In a stage apparatus of the character mentioned the combination of an endless path, a vehicle supported by a suitable contrivance to leave the wheels thereof free, means for revolving said wheels, a receptacle containing loose earth for such wheels to grind in to raise dust, and one or more fans operated by suitable means and appropriately disposed about said apparatus, substantially as described and for the purposes set forth.

4. In a stage apparatus of the class mentioned, in combination, a pipe arranged within the housing of the endless path, parallel to the top thereof, and having numerous small perforations on its upper surface, and being closed at one end, and connected at the other by suitable means to a receptacle generating or containing steam, so that such steam will be forced into said pipe and caused to ooze out of the small perforations therein, substantially as set forth.

Dated June 2, 1892.

WILLIAM H. LYTELL.

Witnesses:
G. G. AMES,
T. J. GEISLER.